(12) United States Patent
Boddu et al.

(10) Patent No.: US 11,449,265 B2
(45) Date of Patent: Sep. 20, 2022

(54) SECURE ERASURE OF A DRIVE ARRAY USING DRIVE-DEFINED, TRUSTED COMPUTING GROUP BANDS

(71) Applicant: Seagate Technology LLC, Fremont, CA (US)

(72) Inventors: Varun Reddy Boddu, Singapore (SG); Siew Lian Tay, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/084,894

(22) Filed: Oct. 30, 2020

(65) Prior Publication Data

US 2022/0137850 A1 May 5, 2022

(51) Int. Cl.
*G06F 3/06* (2006.01)
*G06F 12/14* (2006.01)

(52) U.S. Cl.
CPC .......... *G06F 3/0652* (2013.01); *G06F 3/0623* (2013.01); *G06F 3/0674* (2013.01); *G06F 12/1408* (2013.01); *G06F 2212/1052* (2013.01)

(58) Field of Classification Search
CPC .... G06F 3/0652; G06F 3/0623; G06F 3/0674; G06F 12/1408; G06F 2212/1052
See application file for complete search history.

(56) References Cited

U.S. PATENT DOCUMENTS

| 7,401,197 | B2 | 7/2008 | Kezuka et al. |
| 8,843,768 | B2 | 9/2014 | Vogel |
| 8,918,651 | B2 | 12/2014 | Greco et al. |
| 9,817,717 | B2 | 11/2017 | Lee |
| 9,892,276 | B2 | 2/2018 | Bell et al. |
| 9,940,231 | B2 | 4/2018 | Vaisanen et al. |
| 2003/0177329 | A1* | 9/2003 | Larvoire ............... G06F 9/4406 711/173 |
| 2009/0182930 | A1* | 7/2009 | Taguchi ................ G06F 3/067 711/100 |
| 2012/0239943 | A1* | 9/2012 | Okamoto ........... G06F 21/6218 713/193 |
| 2015/0052369 | A1* | 2/2015 | Koning .................. H04L 9/085 713/193 |

(Continued)

OTHER PUBLICATIONS

Trusted Computing Group, "Enterprise SED Presentation", Sep. 2010, https://www.trustedcomputinggroup.org/wp-content/uploads/SWG_TCG_Enterprise-Introduction_Sept2010.pdf (Year: 2010).*

(Continued)

*Primary Examiner* — Michael Krofcheck
(74) *Attorney, Agent, or Firm* — Mueting Raasch Group

(57) ABSTRACT

Partitions of drives are used to form a volume of a drive array. Each partition is associated with a trusted computing group (TCG) band. Each drive encrypts data stored on the partition with a key unique to the TCG band. The volume is formed using the partitions of the drives. In response to a band-based erasure being invoked on the volume, each drive of the plurality of drives overwrites the key of the TCG band associated with the partition and provides an erasure certificate attesting to the overwriting of the key. The erasure certifications from the drives are compiled into a consolidated erasure certification that attests to the erasure of the volume.

19 Claims, 6 Drawing Sheets

(56) References Cited

U.S. PATENT DOCUMENTS

2021/0223968 A1* 7/2021 Umesawa ............... G06F 21/79

OTHER PUBLICATIONS

Trusted Computing Group, "TCG Storage Security Subsystem Class: Enterprise Specification Version 1.0" Jan. 27, 2009, https://trustedcomputinggroup.org/wp-content/uploads/TCG_SWG_SSC_Enterprise-v1r1-090120.pdf (Year: 2009).*

Seagate, "Seagate Secure Certified Erase Protects Data and Enables the Circular Economy", Oct. 5, 2020, 7 pages.

* cited by examiner

SECURE ERASURE OF A DRIVE ARRAY USING DRIVE-DEFINED, TRUSTED COMPUTING GROUP BANDS

SUMMARY

The present disclosure is directed to a method and system for secure erasure of a drive array using drive-defined, trusted computing group bands. In one embodiment, a method involves within each drive of a plurality of drives of a drive array: defining a partition of the drive used to form a volume of the drive array; and associating the partition with a trusted computing group (TCG) band, the drive encrypting data stored on the partition with a key unique to the TCG band. The method further involves forming the volume using the partitions of the drives. In response to a band-based erasure being invoked on the volume, each drive of the plurality of drives performs: overwriting the key of the TCG band associated with the partition; and providing an erasure certificate attesting to the overwriting of the key. The erasure certifications from the drives are compiled into a consolidated erasure certification that attests to the erasure of the volume.

In another embodiment, a drive apparatus includes a data storage medium having at least first and second partitions. The drive apparatus includes a host interface operable to receive user data from a host and a controller coupled to the data storage medium and the host. The controller is operable to associate the first partition with a first trusted computing group (TCG) band; encrypt the user data stored on the first partition with a key unique to the first TCG band; receive from the host an invocation of a band-based erasure on the first TCG band; and in response to the invocation: delete the key of the first TCG band associated with the partition; and provide to the host an erasure certificate attesting to the deletion of the key. The deletion of the key renders the user data stored on the first partition unreadable and does not affect other data stored on the second partition.

In another embodiment, a system includes a drive array comprising a plurality of drives. Each drive includes a selected partition designated for inclusion in a RAID volume. The system includes a host apparatus coupled to the plurality of drives and is operable to, for each drive of the plurality of drives, instruct each drive to associate the selected partition with a respective trusted computing group (TCG) band. Each drive encrypts data stored on the selected partition with a key unique to the respective TCG band. The host apparatus forms the RAID volume using the selected partitions of the plurality of drives. In response to a band-based erasure being invoked on the RAID volume, each drive of the plurality of drives is instructed by the host apparatus to delete the key of the TCG band associated with the selected partition; and provide an erasure certificate attesting to the deletion of the key. The host apparatus compiles the erasure certifications from the drives into a consolidated erasure certification that attests to the erasure of the volume. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
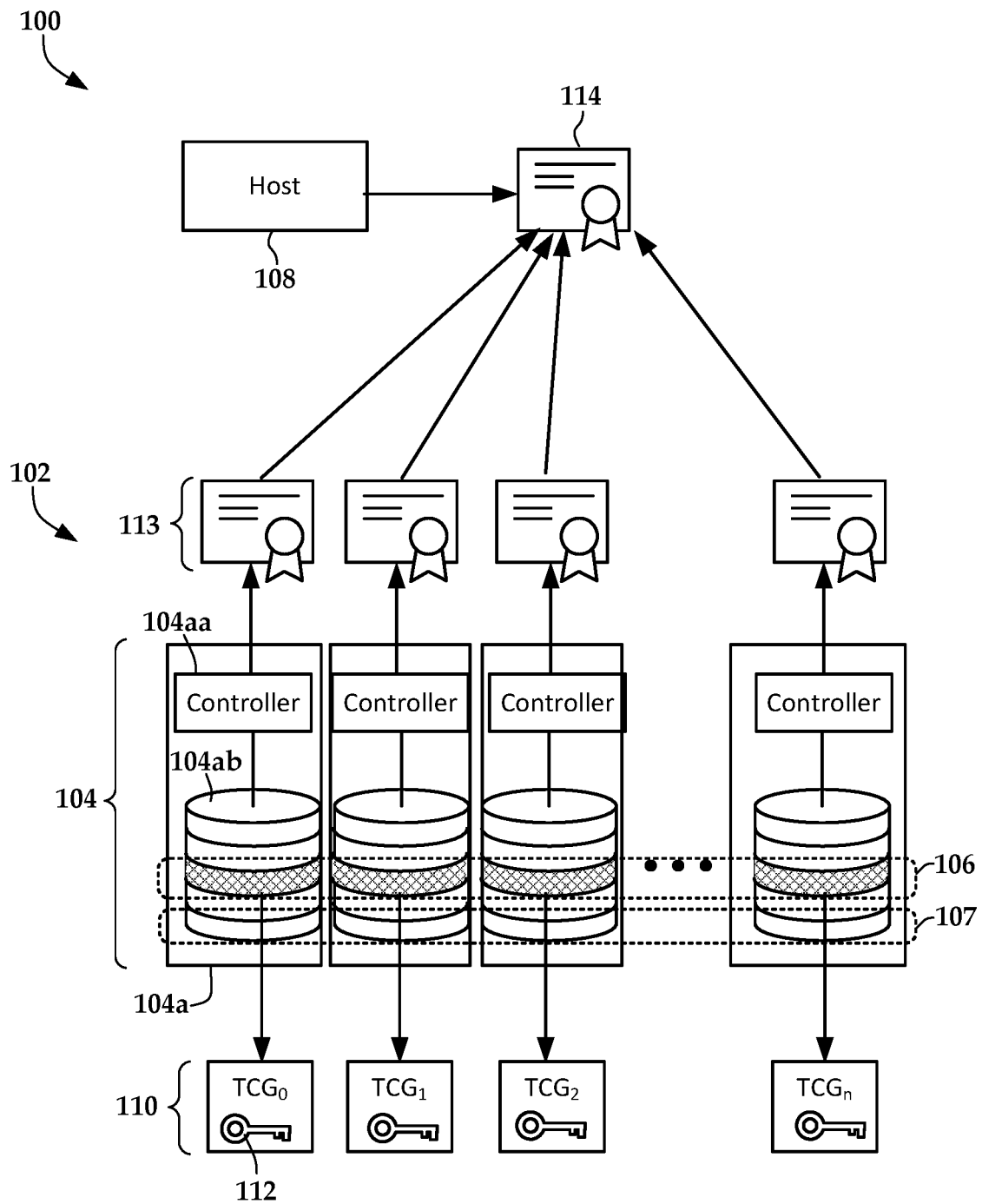
FIG. 1 is a block diagrams of a drive array according to an example embodiment.

The present disclosure generally relates to secure data storage systems. While many computing applications can benefit from secure data storage, there is increasing demand for high levels of security in Internet connected storage services. These services, often referred to as "cloud storage," have grown significantly over the past decade. By one estimate, the cloud storage market is expected to grow an average annual growth rate of 24% over a forecast period from 2019 to 2024. Cloud storage can have a number of advantages over in-house storage systems, such as low cost, advanced security and logging features, and easy access to data by a large number of end users.

One security issue that may concern some end users of cloud storage is secure deletion of data. For purposes of this disclosure, the terms "deletion," "sanitization," "erasure," etc. refer to the rendering of data unreadable from a non-volatile storage medium on which it was originally stored. Traditionally, sanitization involved using an erasure method specific to the storage medium (e.g., overwriting the data on magnetic storage with an erasure field, resetting the cell charge values in flash memory, etc.). In other cases, the data is encrypted when stored, so that it can be sanitized/deleted by destroying the encryption keys, and therefore does not require a lengthy overwrite process.

Users may have a number of reasons to want to ensure data is securely and reliably erased, such as to prevent leakage of personal or financial data, compliance with corporate data retention policies, etc. If the owner of the data has physical access to the storage media, data can be deleted at a high level of confidence, e.g., by physically destroying the media, even though this may not always be cost effective. Other methods of secure erasure can be performed and validated in-house, e.g., a secure wipe performed by a company's information technology (IT) department, without having to physically destroy the storage medium.

In cloud storage, the owners of the data should be able to trust that the cloud service vendor can sanitize any stored data that is later erased, and further attest to the erasure. Note that data sanitization and attested erasure may be important to many types of data storage systems, and not just for cloud storage. For example, there may be a desire for owners of personal computers (e.g., laptops, desktops) to easily and reliably sanitize the computer drives so that the users can safely donate or dispose of the equipment without worrying about that private data might be recoverable from the equipment.

In this disclosure, systems and method are described that can perform a certified erasure on multiple disk arrays, which are configured for redundancy using a redundant array of independent disks (RAID) architecture. Generally, RAID is a technique for combining multiple storage devices (or partitions thereof) into a single virtual storage device.

Different combination schemes are designated by different RAID levels, e.g., RAID 0, RAID 1, RAID 5, etc. Some RAID levels incorporate redundancy between multiple disks which increases the mean time between failures (MTBF) and increases fault tolerance in the event of failure. Some RAID levels can increase storage performance, e.g., parallelizing writes and reads to multiple drives which increases throughput. A RAID volume can be implemented in software (e.g., via an operating system utility or driver) or hardware (e.g., storage controller card). Due to their flexibility and performance, RAID arrays are utilized by a wide range of applications and end users.

Because a RAID array includes multiple storage devices, the deletion of a RAID volume will involve deleting data (e.g., partitions, entire drives) of multiple storage devices. While this can be accomplished by sanitizing the entire drive, in some cases each drive may have multiple partitions that each belongs to a different RAID volume, and erasure of the all of the drives would erase all of the other RAID volumes. Thus erasure of a RAID volume that is distributed on drives with other RAID volumes that should not be erased may involve a host-based erasure. The host (e.g., computer or storage control card) will have knowledge of the drives/partitions that make up a RAID volume, and can erase just those partitions that are affected, e.g., by overwriting the recording medium.

Using host-based erasure methods (e.g., overwriting stored data) can be time consuming. In a technique known as cryptographic erasure, the host may encrypt the stored data for a RAID volume and then overwrite the keys (e.g., multiple times), which can enable fast erasure of the volume. For purposes of this disclosure, the overwriting of keys may be alternatively referred to as deletion or secure deletion, and may be performed differently than deletion of other data on the drive, e.g., user data, which is not always overwritten. However, the hardware and software stack of a storage controller and/or host may include a collection of components from various different vendors and sources, and this makes it difficult to guarantee that the keys were erased with high levels of confidence. In contrast, a secure erasure that is performed within the drive itself can be certified to a high level of confidence, because the drive vendor can exercise tight control over the drive firmware and hardware. This allows the drive as a unit to undergo rigorous security validations of the drive's security services and cryptographic requirements. This may involve validation of the erase functions, keychain design, key wrapping design, and key destruction on cryptographic erase. The drive can provide an erasure certificate signed by the drive which asserts to the secure erasure of data.

In embodiments, described below, a persistent data storage device (e.g., hard disk drive, solid-state drive) is described that can securely erase portions of the drive (e.g., partitions) and attest to the erasure using a certification. This data purge attestation is performed on multiple devices or parts of multiple devices and a consolidated certification of erasure events can be formed. In this way, a RAID volume can be securely erased and a single certificate will include attestation of all erased partitions in the volume by the drives themselves. Data that is stored on other partitions of each drive will not be affected by the erasure, and therefore volumes that span these drive can still operate normally.

In FIG. 1, a system 100 illustrates secure erasure of a distributed storage volume according to an example embodiment. A drive array 102 includes a plurality of drives 104. Using drive 104a as an example, each drive has a controller 104aa and a storage medium 104ab. The storage medium 104ab can include any form of persistent data storage media, including magnetic disks, flash memory, resistive random-access memory, magnetoresistive random-access memory, etc. Each storage medium is divided into partitions, as indicated by the bands on storage medium 104ab. The partitions may be defined in any way, such as by logical block addresses, physical addresses, etc.

The partitions of the drives 104 used to form a distributed volume of the drive array 102. In this example, two volumes 106, 107 are shown that span all of the drives 104. These volumes 106, 107, may use any RAID level, and may use features such as declustered parity, random assignment of partitions, etc. Generally, a host 108 or other device (e.g., storage controller board) defines the volumes by creating the partitions and using its own mapping of RAID units to the partitions. Thereafter, the host 108 distributes read and write requests appropriately to the partitions based on the particulars of the RAID level used, and may perform other actions such as calculating parity for the volumes and monitoring health of the array (e.g., data scrubbing).

Because the host 108 that creates and operates the RAID volumes, the drives 104 may not have any knowledges of how the partitions are being used. Each drive 104 may have a partition table set up by the host 108 on the drive's boot record that gives the drive 104 some information, such as partition type and filesystem. Even with this data, the drive 104 does not necessarily need to look at this information in its normal operation, and will generally not treat a RAID partition any differently than a non-RAID partition. However, in order for the host 108 to be able to rely on the drives 104 to securely delete portions of a RAID volume on their own, the drive 104 will maintain additional data about the partitions that have been set up on the drive's boot record.

As seen in the figure, each partition of each drive 104 is internally associated by the drive 104 with a trusted computing group (TCG) band. Generally, the TCG is a consortium of technology companies with the goal of implementing trusted computing concepts within computing devices. A TCG band is a division of the storage within a secure encrypted drive (SED) that allows cryptographic erase of selected parts of the drive. In the illustrated example, the partitions of the volume 106 are associated with (e.g., mapped to) the TCG bands 110. Each TCG band 110 has an associated key (e.g., data encryption key 112) that is unique to the TCG band 110, and the drive 102 encrypts data stored on the partition with the key 112.

In the illustrated example, the volume 106 is subject to a cryptographic erase. The host 108 will determine the TCG band 110 associated with each partition of the volume 106, and invoke a band-based erasure on the volume 106. In response to the band-based erasure, each drive 104 overwrites/deletes the key of the TCG band associated with the partition and provides an erasure certificate 113 attesting to the deletion/overwriting of the key. The host 108 compiles the erasure certifications 113 from the drives into a consolidated erasure certification 114 that attests to the erasure of the volume 106.

The consolidated erasure certification 114 can be used by the host 108 or another entity to attest to the erasure of the volume 106. The host 108 or other entity can extract the erasure certificates for the drives from the consolidated erasure certification, and extract signatures for the drives 104 from the consolidated erasure certification. A verification module is invoked in each of the drives 104 using the respective signature and erasure certification of the drive 104. The verification modules verify the respective erasure certifications of the drives 104.

In this example, each drive of the plurality of drives 104 has another partition separate from the partition that is part of the erased volume 106. In this example, these partitions include those that make up RAID volume 107. Deleting/overwriting the keys of the TCG bands 110 associated with the deleted volume 107 does not affect either the data or the operation of the partitions of volume 107. In this way, deleted volume 106 can be taken off line and/or reused without affecting the rest of the drive array 102.

The partitions of the drives 104 are defined by a small amount of data written to the start of the drive's address space, e.g., first sector of a hard disk, first logical block address of a solid-state drive. This data is used to manage how the partitions are created and organized on each drive 104. There are generally two different schemes for defining the partition data. Master boot record (MBR) is a legacy implementation which includes three parts: master boot code, partition table for the drive, and drive signature.

A more modern partitioning scheme is known as globally-unique identifier (GUID) partition table (GPT). The GPT addresses limitations and challenges of MBR. GPT includes a protected MBR which is used in a way that prevents MBR-based disk utilities from misrecognizing and possibly overwriting GPT disks. The GPT scheme uses a primary GUID partition table header which records its own size and location and the size and location of the secondary GPT header, a primary GUID partition entry array, a backup GUID partition entry array, and a backup GUID partition table header.

Figure 2:
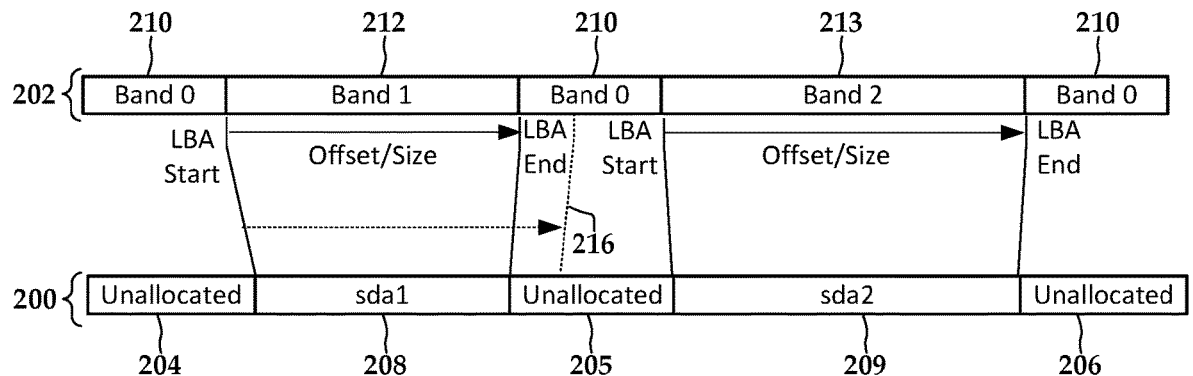
FIGS. 2 and 3 are block diagrams of a mapping between drive partitions and secure erase bands according to an example embodiment.

In FIG. 2, a block diagram illustrates a mapping between a partition table 200 and TCG bands 202 according to an example embodiment. By default, drives that implement TCG secure drive erasure have at least one allocated band, which is the global band (band 0). Based on the firmware support for the number of bands, additional bands can be enabled and allocated with logical block address (LBA) ranges. While implementing the partition schemes such as MBR and GPT for storage devices, partition tables are created with user allocated LBA ranges.

Figure 3:
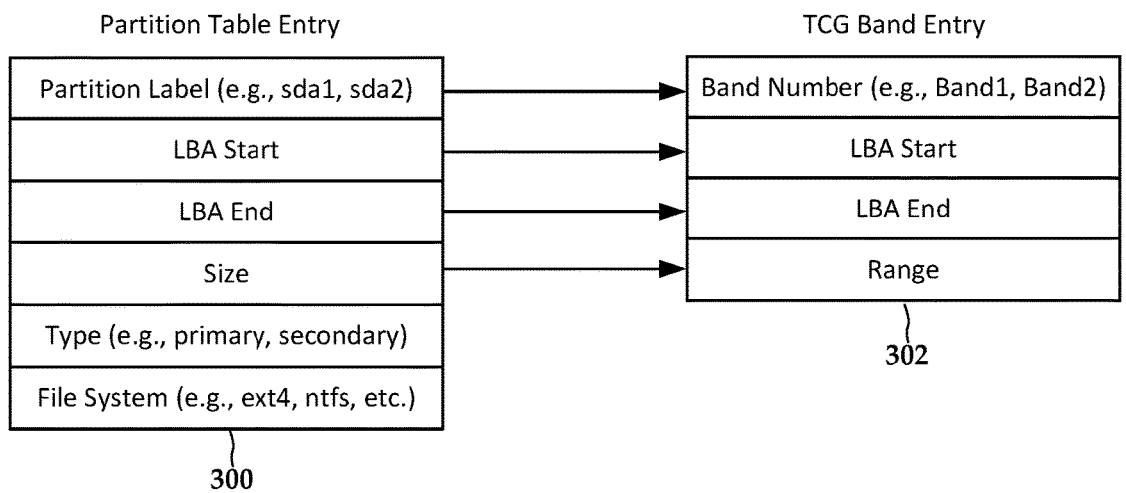

In the example shown in FIG. 2, the partition table 200 has three unallocated partitions 204-206, which are all mapped to the global band 210. Note that even though these partitions 204-206 are unallocated and likely unused, they may still be considered "partitions" as the term is used herein, even though they may not be written in the partition tables. The partition table shows two allocated partitions 208, 209, which are labeled in this example using a Linux naming convention (sda, sdb, etc.). The allocated partitions 208 and 209 are mapped to respective TCG bands 212 and 213. The block diagram in FIG. 3 illustrates example data structures that can be used to perform this mapping. The data structure 300 may be part of partition table stored in the MBR or GPT, and structure 302 may be stored internally by the drive firmware.

The host can query each drive in a volume for the TCG information in data structure 302 by sending certain TCG commands. This information can be used in creating the mapping seen in FIG. 3. When the host is directed to erase a volume, the host can retrieve the TCG band associated with each partition of the volume, each TCG band being associated with one drive. The host sends each drive a request for secure erasure of a specific TCG band (or range of LBAs associated with a TCG band). In response, the key for the TCG band will be securely overwritten via the drive firmware, and the illustrated mapping shown in FIGS. 2 and 3 may also be deleted, or may be retained for reuse by the host. For example, if the partition bounds do not change after an erasure, the drives can associate a new key with the erased TCG band and new data can be written to the LBAs of that band using the new key. If the partition boundaries change after secure erasure of the TCG band, then the mapping of the TCG band to new LBAs may also be possible assuming the new boundaries do not overlap with the extents of other previously defined TCG bands except perhaps the global band. For example, in reference to FIG. 2, if TCG band 212 is deleted and then the size of sda1 is increased as indicated by dashed line 216, then the mapping for TCG band 212 may be adjusted by changing the LBA End and Range values in the structure 302 in FIG. 3. These changes would also be reflected in the partition table 300. In other embodiment, after erasure of the TCG band 212, all of its mapping data may be deleted and recreated. In response to the creation of a new partition or changing of an existing partition, the TCG band identifier (e.g., Band 1) could be reused, or it could be retired and another TCG band identifier selected.

Figure 4:
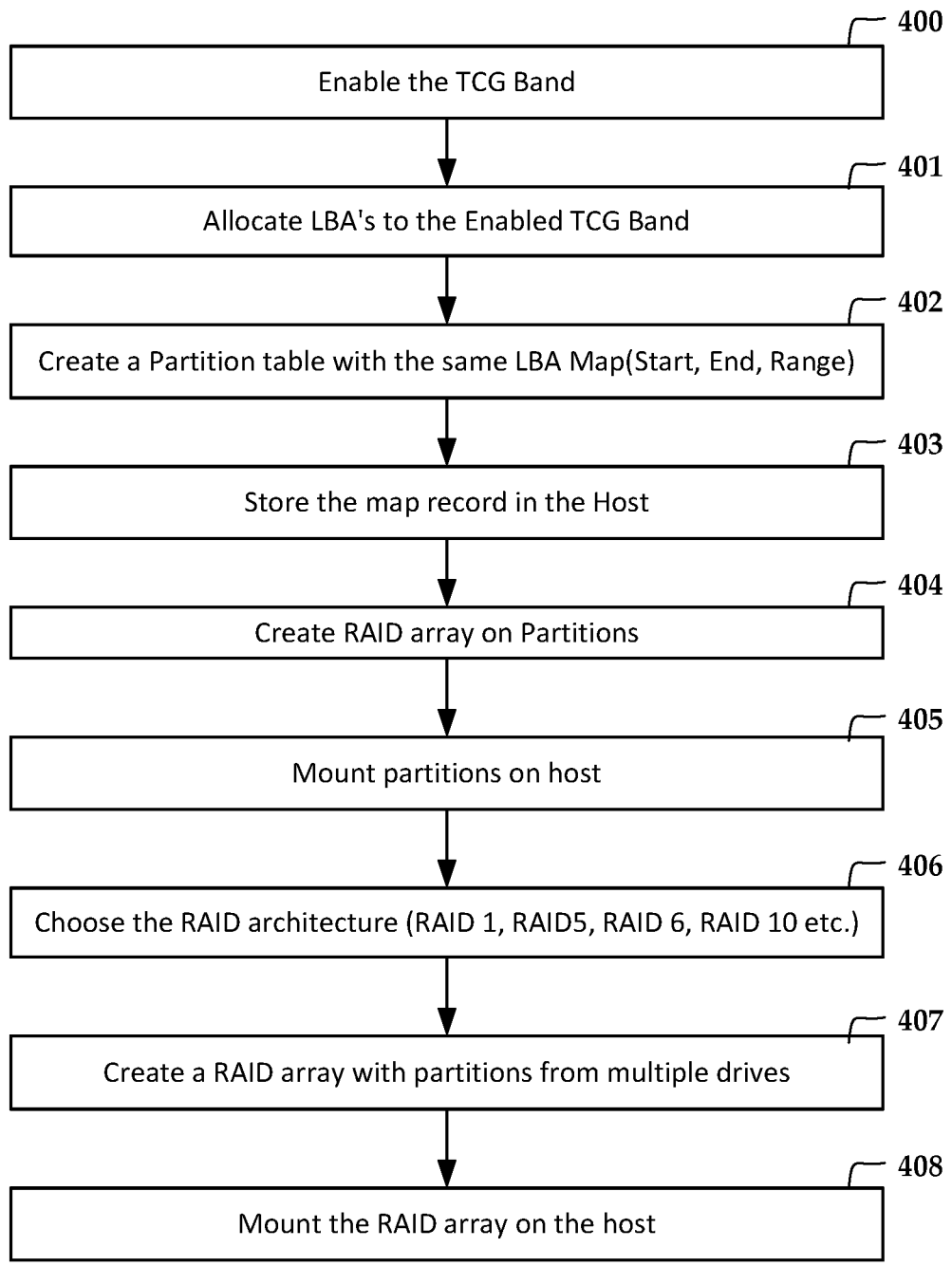
FIG. 4 is a flowchart of a method according to an example embodiment.

In FIG. 4, a flowchart shows a process used to create mappings as shown in FIGS. 2 and 3, and further to create a RAID array using the mapped partitions according to an example embodiment. The mapping steps involve enabling 400 the TCG band and allocating 401 LBA's to the enabled TCG band. A partition table is created 402 with the same LBA map(start, end, range) as previously allocated 401 for the TCG band. The map record is stored 403 in the host.

After storing 203 the map record, the host can create 404 a RAID array that supports certified erase on the partitions. The RAID array creation 404 involves mounting 405 partitions on the host. The desired RAID level/architecture (RAID 1, RAID5, RAID 6, RAID 10, etc.) is chosen 406 and a RAID array is created 407 with partitions from multiple drives. The RAID array is then mounted 408 on the host. The RAID array is mapped to the host with a RAID device handle. For example, by utilizing the GNU/Linux mdadm utility in the host, the above RAID array can be mapped as a block storage device such as/dev/md0.

Figure 5:
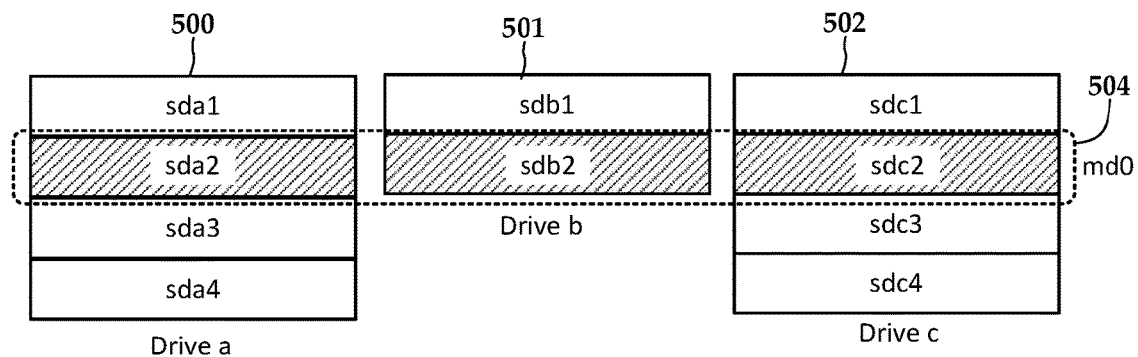
FIGS. 5 and 6 are block diagrams showing assembly of drive partitions into an array according to an example embodiment.
Figure 6:
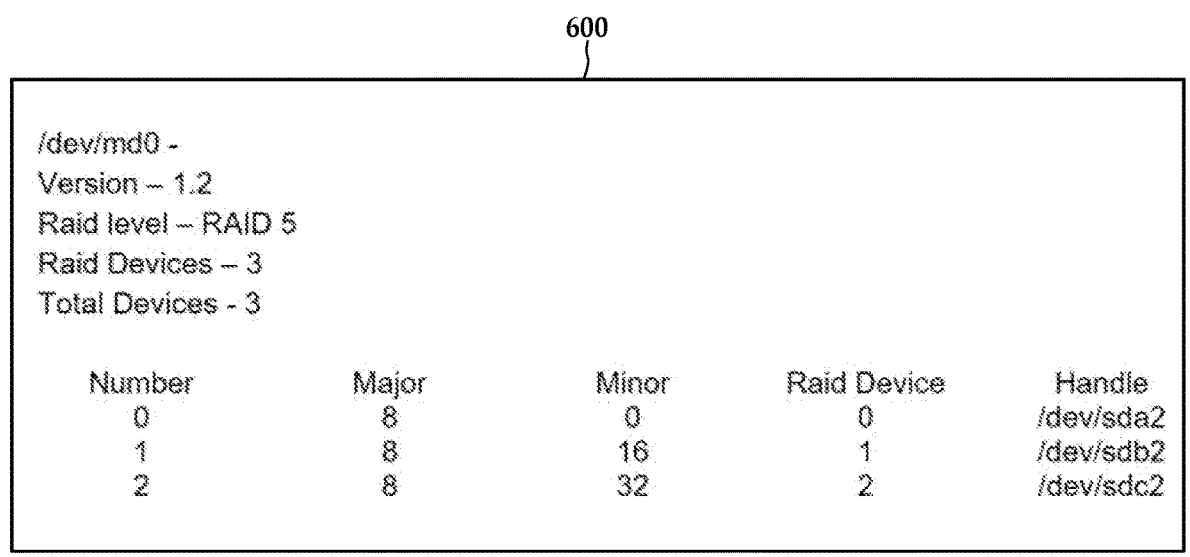

In FIGS. 5 and 6, diagrams illustrate how partitions can be mapped into a RAID array suitable for secure certified erasure according to an example embodiment. In FIG. 5, three partitions sda2, sdb2, and sdc3 from drives 500-502 are selected to form a RAID 5 volume 504, which is designated md0 by the host. The configuration data 600 in FIG. 6 shows data maintained by the host that is used to define the volume 504. Note that this data 600 does not include any LBAs of the partitions, although that can be derived by looking at the partition tables in each of the drives 500-502, which will show the partition names and their LBAs.

Figure 7:
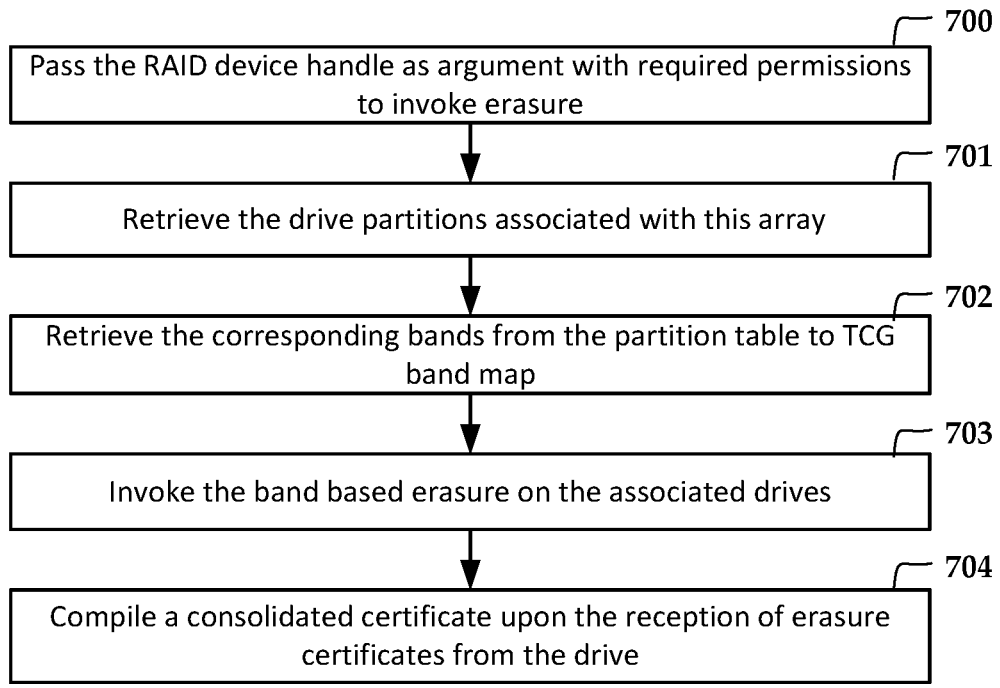
FIGS. 7 and 8 are flowcharts of methods according to other example embodiments.

In FIG. 7, a flowchart illustrates a method for executing certified erasure on a RAID array according to an example embodiment. The method involves passing 700 the RAID device handle as argument with required permissions to invoke erasure. In the example shown in FIGS. 5 and 6, the RAID device handle is/dev/md0, and permissions to invoke erasure may be specific to the band. The drive partitions associated with this array are retrieved 701. In the example shown in FIGS. 5 and 6, this would involve retrieving partitions/dev/sda2, /dev/sdb2, and/dev/sdc3. The corresponding bands from the partition table to TCG band map are retrieved 702. This would involve using a mapping structure such as shown in FIG. 3 that was created when forming the RAID volume. For example, the LBAs of partition/dev/sda2 in the present example may be mapped to TCG Band 1 of drive sda (see drive 500 in FIG. 5). The band-based erasure on the each drives associated with the RAID device is invoked 703. In the present example, this would involve invoking erasure of TCG Band 1 on drive 500, which will involve deleting the key associated with TCG Band 1. In response to the invocation 703, all drives would return an erasure certificate associated with the drive's unique hardware identifier. The host would then compile 704 a consolidated certificate upon the reception of erasure certificates from the drives.

Figure 8:
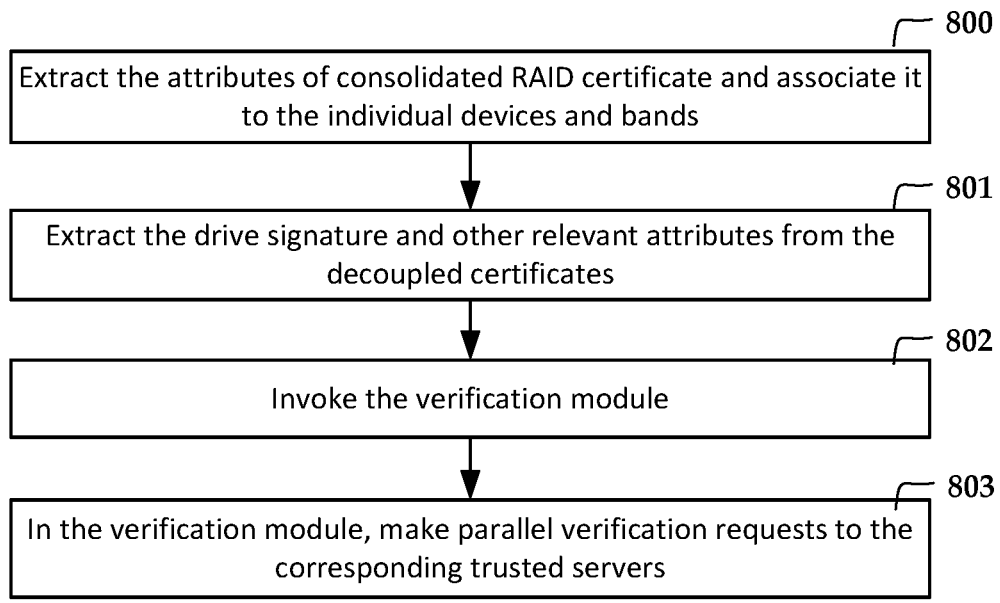

In FIG. 8, a flowchart illustrates a method for RAID erasure certificate verification according to an example embodiment. The method involves extracting 800 the attributes of the consolidated RAID certificate and associating it to the individual devices and bands. The drive signature and other relevant attributes are extracted 801 from the decoupled certificates and the verification module is invoked 802. In the verification module, parallel verification requests 803 are made to the corresponding trusted servers.

Figure 9:
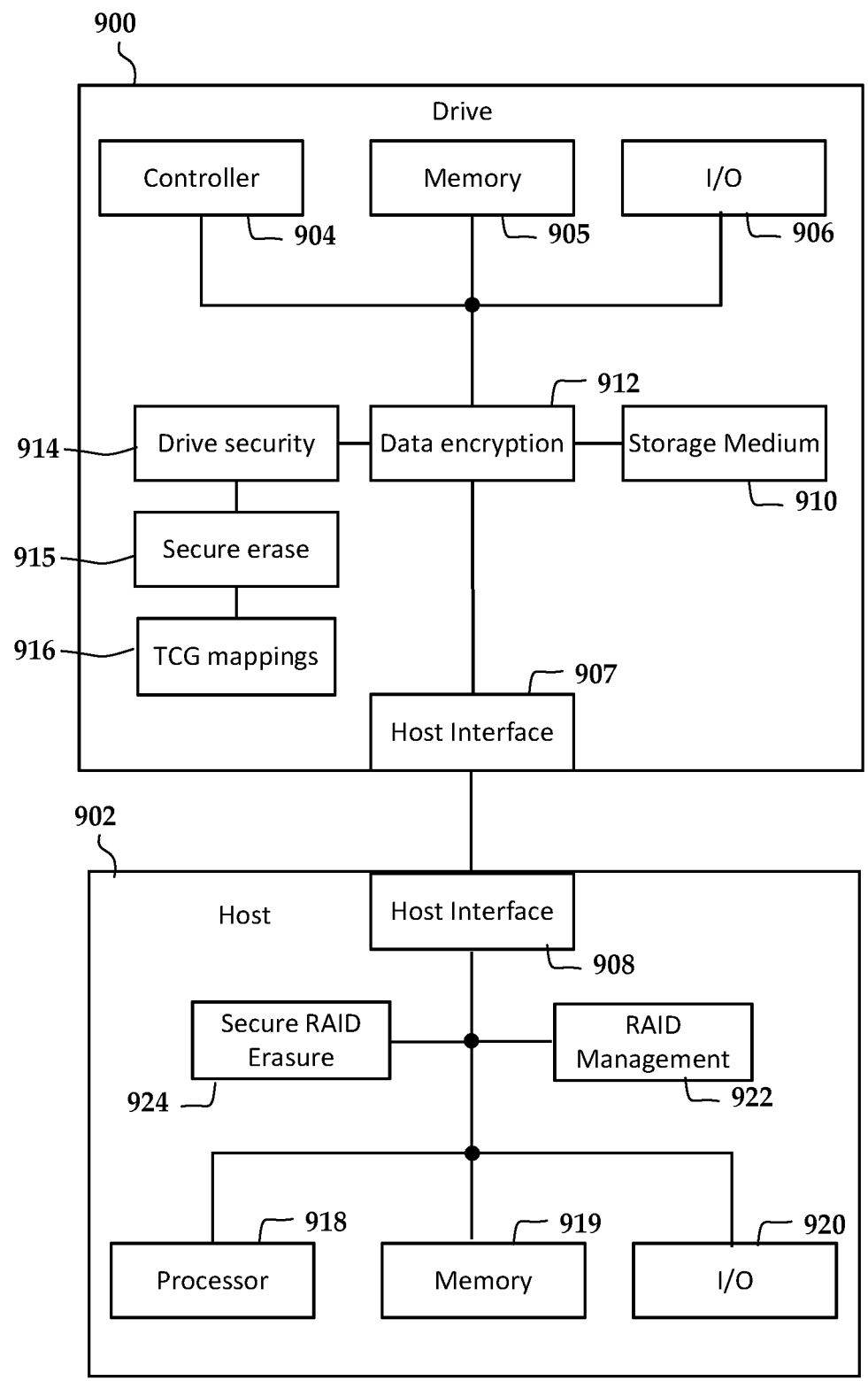
FIG. 9 is a block diagram of a system and apparatuses according to an example embodiment.

In FIG. 9, a block diagram shows a system and apparatus according to an example embodiment. Generally, the system includes at least one drive apparatus 900 and at least one host apparatus 902. The drive apparatus 900 typically includes a system on a chip (SoC) which consolidates a number of computer functions into one chip or chip assembly. Those computer functions include that of a controller 904 (e.g., a central processing unit or other programmable logic circuit), memory 905, and input/output (I/O) channels 906. The memory 905, which can include volatile and/or non-volatile memory, will include firmware/software instructions operable by the processor 904 to perform storage operations of the drive apparatus 900.

Among the I/O channels 906 of the drive apparatus 900 is a host interface 907 operable to communicate with a compatible host interface 908 of the host 902. Examples of host interface hardware and protocols include SATA, SaS, NVMe, SCSI, etc. Generally, the drive's host interface 907 receives all incoming storage commands (e.g., read, write, verify), causes the commands to be executed such that user data (which generally refers to data originating from the host 902) is written and read from a storage medium 910 and communicated to/from the host 902. The storage medium 910 may include any combination of non-volatile storage media described above, such as magnetic disk, flash memory, etc.

The drive apparatus 900 is operable to internally encrypt and decrypt user data that is transferred to and from the storage medium 910. This encryption and decryption is performed by data encryption module 912, which is part of a collection of internal security features, generally indicated by drive security module 914. The drive security module 914 manages internal and external security transactions and tasks, such as key management, host authentication, tamper detection, etc. In this example, the drive security module 914 also includes a secure erase module 915 and a TCG mapping module 916. These two modules manage the multiple mapping of TCG bands to LBAs, and tracks the encryption and erasure of the TCG bands.

The host apparatus 902 also includes computing hardware such as processor 918, memory 919 and I/O 920, and this may be implemented as an SoC (e.g., for a storage controller card) or as separate components (e.g., as in a server computer or workstation). The host 902 includes a RAID management module 922 that assembles RAID volumes/devices and distributes user data to/from those devices appropriately. The host apparatus 902 also includes a secure RAID erasure module 924 that is operable to invoke a band-based erasure being invoked on a RAID volume. This causes the drive apparatus 900 (and other drives that are part of the volume) delete the key of a TCG band associated with a partition of the storage media 910 and provides (e.g., from secure erase module 915) an erasure certificate attesting to the deletion of the key. The secure RAID erasure module 924 the compiles the erasure certifications from the drives into a consolidated erasure certification that attests to the erasure of the volume.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
within each drive of a plurality of drives of a drive array:
defining a partition of the drive used to form a volume of the drive array; and associating the partition with a trusted computing group (TCG) band, the drive encrypting data stored on the partition with a key unique to the TCG band;
forming the volume using the partitions of the drives;
in response to a band-based erasure being invoked on the volume, performing, within each drive of the plurality of drives: overwriting the key of the TCG band associated with the partition; and providing an erasure certificate attesting to the overwriting of the key; and
compiling unique hardware identifiers of the drives and the erasure certificates from the drives into a consolidated erasure certification that attests to the erasure of the volume, the consolidated certification being used to form verification requests sent to each of the drives to verify the erasure of the volume.

2. The method of claim 1, further comprising within each drive, storing a map between the partition and the associated TCG band.

3. The method of claim 2, wherein the map is formed based on start and end addresses of the partition that are stored in one of a master boot record (MBR) or a globally unique identifier (GUID) partition table (GPT).

4. The method of claim 1, further comprising:
extracting the erasure certificates for the drives from the consolidated erasure certification;
extracting the respective unique hardware identifiers for the drives from the consolidated erasure certification; and
invoking a verification module in each of the drives using the respective unique hardware identifier and erasure certificate of the drive, the verification modules verifying the respective erasure certificates of the drives.

5. The method of claim 1, wherein each drive of the plurality of drives has another partition separate from the partition, and wherein overwriting the key of the TCG band associated with the partition does not affect data stored on the other partition.

6. The method of claim 1, wherein the compiling the erasure certificates from the drives into the consolidated erasure certification is performed by a host apparatus that forms and uses the volume.

7. The method of claim 6, wherein the host apparatus maintains, for each drive, a mapping between the TCG band and addresses of the partition associated with the TCG band.

8. The method of claim 1, wherein the volume comprises a redundant array of independent disks (RAID) volume.

9. A drive apparatus, comprising:
a data storage medium, the data storage medium comprising at least first and second partitions;
a host interface operable to receive user data from a host; and
a controller coupled to the data storage medium and the host, the controller operable to:
associate the first partition with a first trusted computing group (TCG) band;
encrypt the user data stored on the first partition with a key unique to the first TCG band;
receive from the host an invocation of a band-based erasure on the first TCG band;
in response to the invocation: delete the key of the first TCG band associated with the partition; and provide to the host an erasure certificate attesting to the deletion of the key, the deletion of the key rendering the user data stored on the first partition unreadable and not affecting other data stored on the second partition, a unique hardware signature of the drive apparatus and the erasure certificate being compiled into a consolidated erasure certification that attests to the erasure of a volume that includes the first partition;
receive a verification request based on the consolidated erasure certification the verification request including at least the erasure certificate; and
in response to the verification request, verify the erasure certificate.

10. The drive apparatus of claim 9, wherein the second partition is unallocated, and is associated with a global TCG band different from the first TCG band.

11. The drive apparatus of claim 9, wherein the second partition is associated by the controller with a second TCG band different from the first TCG band, other user data stored on the second partition being encrypted with a second key unique to the second TCG band.

12. The drive apparatus of claim 9, wherein the first partition is used as part of a redundant array of independent disks (RAID) volume that further comprises other partitions from other drive apparatuses.

13. The drive apparatus of claim 9, wherein the host maintains a mapping between the first TCG band and addresses of the first partition.

14. A system, comprising:
a drive array comprising a plurality of drives, each drive comprising a selected partition designated for inclusion in a redundant array of independent disks (RAID) volume; and
a host apparatus coupled to the plurality of drives and operable to:
for each drive of the plurality of drives, instruct each drive to associate the selected partition with a respective trusted computing group (TCG) band, each drive encrypting data stored on the selected partition with a key unique to the respective TCG band;
form the RAID volume using the selected partitions of the plurality of drives;
in response to a band-based erasure being invoked on the RAID volume, instructing each drive of the plurality of drives to delete the key of the TCG band associated with the selected partition; and provide an erasure certificate attesting to the deletion of the key; and
compile unique hardware identifiers of the drives and the erasure certificates from the drives into a consolidated erasure certification that attests to the erasure of the volume, the consolidated certification being used to form verification requests sent to each of the drives to verify the erasure of the volume.

15. The system of claim 14, wherein each drive of the plurality of drives stores a map between the selected partition and the associated TCG band.

16. The system of claim 15, wherein the map is formed based on a start and end addresses of the selected partition that are stored in one of a master boot record (MBR) or a globally unique identifier (GUID) partition table (GPT).

17. The system of claim 14, wherein the host apparatus is further operable to:
extract the erasure certificates for the drives from the consolidated erasure certification;
extract the respective unique hardware identifiers for the drives from the consolidated erasure certification; and
invoke a verification module in each of the drives using the respective unique hardware identifier and erasure certificate of each drive, the verification modules verifying the respective erasure certificates of each drive.

18. The system of claim 14, wherein each drive of the plurality of drives has another partition separate from the selected partition, and wherein overwriting the key of the TCG band associated with the partition does not affect data stored on the other partition.

19. The system of claim 14, wherein the host apparatus maintains, for each drive, a mapping between the TCG band and addresses of the selected partition associated with the TCG band.

* * * * *